United States Patent [19]

Lenz

[11] 3,919,199

[45] Nov. 11, 1975

[54] 6-CYANOMETHYLENE-3β,5α-17-TRIHYDROXY-17α-PREGNANE-21-CARBOXYLIC ACID-γ-LACTONE AND INTERMEDIATES

[75] Inventor: George R. Lenz, Glenview, Ill.

[73] Assignee: G. D. Searle & Co., Chicago, Ill.

[22] Filed: June 13, 1974

[21] Appl. No.: 478,917

[52] U.S. Cl. ........ 260/239.57; 260/397.1; 424/241; 424/238
[51] Int. Cl.² .......................................... C07J 19/00
[58] Field of Search .................. 260/239.57, 397.1

[56] References Cited
UNITED STATES PATENTS
3,483,233  12/1969  Stache .................. 260/397.3

Primary Examiner—Ethel G. Love
Attorney, Agent, or Firm—John M. Brown

[57] ABSTRACT

The anti-DCA utility of 6-cyanomethylene-3β,5α,17-trihydroxy-17α-pregnane-21-carboxylic acid γ-lactone and its preparation via the corresponding 3-acetate are disclosed.

2 Claims, No Drawings

6-CYANOMETHYLENE-3,5-17-TRIHYDROXY-17-PREGNANE-21-CARBOXYLIC ACID--LACTONE AND INTERMEDIATES

This invention relates to 6-cyanomethylene-3,5,17-trihydroxy-17-pregnane-21-carboxylic acid -lactone, an intermediate thereto, and a process for their preparation. More particularly, this invention provides a new, useful, and unobvious steroid having the formula

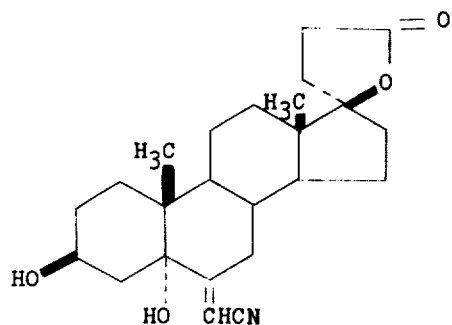

The enformulated compound is useful by reason of the valuable biological activity which inheres therein. For example, it is adapted to reverse the effect of desoxy= corticosterone acetate (DCA) on urinary sodium and potassium, and as such is diuretic. The corresponding 3-acetate is useful as an intermediate whereby 6-cyanomethylene-3,5,17-trihydroxy-17-pregnane-21-carboxylic acid -lactone can be prepared.

Equivalent to the foregoing compounds for the purposes of this invention are the hydroxy acids, and salts and esters thereof, preparable by procedures well-known in the art and which can be generically depicted by the formula

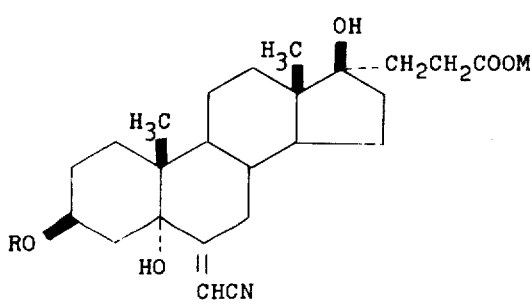

wherein M represents hydrogen, alkali metal, alkaline-earth metal/2, ammonium, or lower alkyl, and R represents hydrogen or acetyl. The term "alkaline-earth metal/2" reflects the fact that when M represents a divalent metal aforesaid, the contemplated salts are more conventionally depicted thus

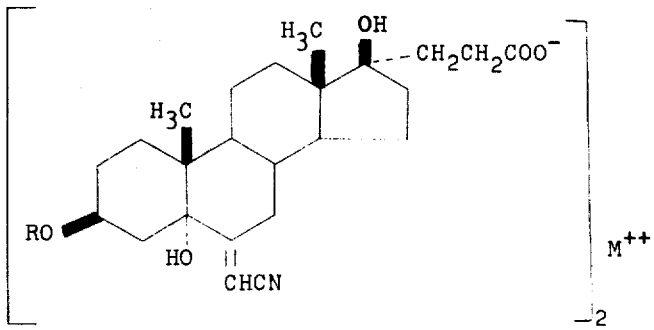

R being defined as before. By "lower alkyl" is meant methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight-or branched-chain, hydrocarbon groupings of the formula $C_nH_{2n+1}$ wherein $n$ represents a positive integer less than 8.

A standardized test for the capacity of a compound to reverse the renal electrolyte effects of DCA, substantially as described by C. M. Kagawa in chapter 34 of volume II of "Evaluation of Drug Activities: Pharmacometrics", edited by D. R. Laurence and A. L. Bacharach, can be carried out as follows: A group (Group I) of 8 male Charles River rats, each weighing between 150 and 200 gm, is adrenalectomized and maintained thereafter on sugar cubes and tap water ad libitum overnight. Each animal is thereupon subjected to these successive treatments: (a) 0.012 mg of DCA dissolved in 0.1 ml of corn oil is injected subcutaneously; (b) 2.4 mg of test compound dissolved or suspended in 0.5 ml of corn oil or other physiologically inert solvent (e.g., aqueous 0.9% sodium chloride) is administered subcutaneoulsy or intra-gastrically, (c) 2.5 ml of aqueous 0.9% sodium chloride is injected subcutaneously. Urinary sodium and potassium are measured by customary techniques on samples of urine collected during the 4 hr. immediately following treatment. Controls are provided by second and third groups of 8 each 150 – 200 gm rats concurrently and identically treated excepting that in Group II, 0.33 mg of spironolactone is substituted for the test compound and the solution thereof is injected subcutaneously, while in Group III neither test compound nor spironolactone is administered. DCA produces sodium (Na) retention, loss of potassium (K), and a corresponding reduction in the mean log Na x 10/K. Spironolactone serves as an index 10/K. the validity of the test, the dose of 0.33 mg having been shown [Hofmann et al., Arch. int. pharmacodyn., 165, 476 (1967)] to induce a 50% reversal of the effects of the DCA. Kagawa [Endocrinology, 74, 724 (1964)] reported a standard error of ω 0.084 per 4-rat response, determined from a large number of tests and based on 60 degrees of freedom, for the mean log Na x 10/K. measurement. From this it can be calculated that the least significant difference (P 0.05) in mean log Na x 10/K between 2 groups of 8 rats each is ω 0.168. It follows that when mean log Na ¼ 10/K for Group I is equal to or greater than that for Group II, and the latter in turn exceeds the value for Group III by at least 0.168 log units, the reversals of the renal electrolyte effects of DCA represented thereby are significant. A compound active at the 2.4 mg dose level is retested at lower doses until the median effective dose (MED), a dose in mg sufficient to produce a 50% inhibition of the renal electrolyte effects of the DCA administered, can be calculated. The subcutaneous MED of 6-cyanomethylene-3,5,17-trihydroxy-17-pregnane-21-carboxylic acid -lactone in the foregoing test was found to be 1.54 mg.

Those skilled in the art will recognize that observations of activity in standardized tests for particular biological effects are fundamental to the development of valuable new drugs, both veterinary and human.

6-Cyanomethylene-3,5,17-trihydroxy-17-pregnane-21-carboxylic acid -lactone can be prepared by contacting 3-acetyloxy-5,17-dihydroxy-6-oxo-17-pregnane-21-carboxylic acid -lactone with diethyl cyanomethyl=phosphonate in the presence of sodium hydride, using cold 1,2-dimethoxyethane as the reaction medium and contacting the 3-acetyloxy-6-cyanomethylene-5,17-dihydroxy-17-pregnane-21-carboxylic acid -lactone which eventuates with sodium methoxide in methanol.

The following example describes in detail the aforesaid preparation. It will be apparent to those skilled in the art that many modifications, both of materials and of methods, may be practiced without departing from the purpose and intent of this disclosure. Temperatures hereinafter are given in degrees centigrade and relative amounts of materials in parts by weight, except as otherwise noted.

EXAMPLE

A.

To a mixture of 5 parts of 57% sodium hydride in mineral oil with 25 parts of 1,2-dimethoxyethane at 0 is added, with stirring, 26 parts of diethyl cyano=methylphosphonate. Stirring at 0 is continued for hour, whereupon 20 parts of 3-acetyloxy-5,17-dihydroxy-6-oxo-17-pregnane-21-carboxylic acid -lactone (U.S. Pat. No. 3,012,029) and 200 parts of tetrahydrofuran are consecutively added. Stirring is continued for a further 2 hours during which the reaction mixture is brought to room temperature, at which point it is poured into a solution of 20 parts of concentrated hydrochloric acid in 980 parts of distilled water. The gummy precipitate which forms is isolated by filtration and taken up in 100 parts of hot methanol. The resultant solution is slowly diluted with 300 parts of distilled water. A white crystalline precipitate forms. This material is 3-acetyloxy-6-cyanomethylene-5,17-dihydroxy-17-pregnane-21-carboxylic acid -lactone which, filtered off and dried in air, melts at 236–239.

B.

To a solution of 1 part of 3-acetyloxy-6-cyanomethylene-5,17-dihydroxy-17-pregnane-21-carboxylic acid -lactone in 50 parts of methanol is added, with stirring, 1 part of sodium methoxide. The resultant mixture is stirred for 1 hour, then poured into 500 parts of 5% hydrochloric acid. The precipitate which forms is isolated by filtration and recrystallized from aqueous methanol to give 6-cyanomethylene-3,5,17-trihydroxy-17-pregnane-21-carboxylic acid -lactone as the hemihydrate melting at 248–251. Water of crystallization is removed therefrom by warming the material in vacuo.

What is claimed is:
1. 6-Cyanomethylene-3,5,17-trihydroxy-17-pregnane-21-carboxylic acid -lactone.
2. 3-Acetyloxy-6-cyanomethylene-5,17-dihydroxy-17-pregnane-21-carboxylic acid -lactone.

* * * * *

UNITED STATES PATENT OFFICE
CERTIFICATE OF CORRECTION

PATENT NO. : 3,919,199
DATED : November 11, 1975
INVENTOR(S) : George R. Lenz

It is certified that error appears in the above-identified patent and that said Letters Patent are hereby corrected as shown below:

Column 1, line 2, "ACID--LACTONE" should read -- ACID-γ-LACTONE --.

Column 1, line 4, "3,5,17" should read -- 3β,5α,17 --.

Column 1, line 21, "17-" should read -- 17α- --.

Column 1, line 21, "-lactone" should read -- γ-lactone --.

Column 1, line 46, "3,5,17-" should read -- 3β,5α,17- --.

Column 1, line 46, "trihydroxy-17" should read -- trihydroxy-17α --.

UNITED STATES PATENT AND TRADEMARK OFFICE
CERTIFICATE OF CORRECTION

PATENT NO. : 3,919,199
DATED : Nov. 11, 1975
INVENTOR(S) : George R. Lenz

It is certified that error appears in the above–identified patent and that said Letters Patent are hereby corrected as shown below:

Column 1, line 47, "- lactone" should read -- γ-lactone --.

Column 2, line 26, "$C_nH_2n^+1$" should read -- $C_nH_{2n+1}$ --.

Column 2, line 43, "intra-gastrically," should read -- intragastrically; --.

Column 2, line 57, "index 10/K." should read -- index of --.

Column 2, line 62, "of ω" should read -- of ± --.

Column 2, line 66, "(P 0.05)" should read -- (P < 0.05) --.

Column 2, line 67, "is ω" should read -- is ± --.

Column 2, line 68, "Na 1/4 10/K" should read -- Na x 10/K --.

Column 3, line 9, "3,5,17" should read -- 3β,5α,17 --.

Column 3, line 9, "17-pregnane" should read -- 17α-pregnane --.

Column 3, line 9, "acid -" should read -- acid γ- --.

Column 3, line 15, "3,5,17" should read -- 3β,5α,17 --.

Column 3, line 15, "17-pregnane" should read -- 17α-pregnane --.

Column 3, line 16, "-lactone" should read -- γ-lactone --.

Column 3, line 17, "3-acetyloxy-5,17" should read -- 3β-acetyloxy-5α,17 --.

UNITED STATES PATENT AND TRADEMARK OFFICE
CERTIFICATE OF CORRECTION

PATENT NO. : 3,919,199
DATED : Nov. 11, 1975
INVENTOR(S) : George R. Lenz

It is certified that error appears in the above—identified patent and that said Letters Patent are hereby corrected as shown below:

Column 3, line 17, "-17-" should read -- -17α- --.

Column 3, line 18, "-lactone" should read -- γ-lactone --.

Column 3, line 19, "cyanomethyl=phosphonate" should read -- cyanomethylphosphonate --.

Column 3, line 21, "3-acetyloxy" should read -- 3β-acetyloxy --.

Column 3, line 22, "5,17-dihydroxy-17-" should read -- 5α,17-dihydroxy-17α- --.

Column 3, line 23, "-lactone" should read -- γ-lactone --.

Column 4, line 1, "0" should read -- 0° --.

Column 4, line 2, "cyano=methyl" should read -- cyanomethyl --.

Column 4, line 3, "0" should read -- 0° --.

Column 4, line 3, "for  hour" should read -- for 1/2 hour --.

Column 4, line 4, "3-acetyloxy-5,17" should read -- 3β-acetyloxy-5α,17 --.

Column 4, line 5, "17-pregnane" should read -- 17α-pregnane --.

Column 4, line 5, "acid -lactone" should read -- acid γ-lactone --.

UNITED STATES PATENT AND TRADEMARK OFFICE
CERTIFICATE OF CORRECTION

PATENT NO. : 3,919,199
DATED : Nov. 11, 1975
INVENTOR(S) : George R. Lenz

It is certified that error appears in the above—identified patent and that said Letters Patent are hereby corrected as shown below:

Column 4, line 16, "3-acetyloxy" should read -- 3β acetyloxy --.

Column 4, line 16, "5,17" should read -- 5α,17 --.

Column 4, line 17, "17-pregnane" should read -- 17α-pregnane --.

Column 4, line 17, "acid -lactone" should read -- acid γ-lactone --.

Column 4, line 18, "236-239." should read -- 236-239°.

γ    Column 4, line 21, "3-acetyloxy" should read -- 3β-acetyloxy --.

Column 4, line 22, "5,17-dihydroxy-17-pregnane" should read -- 5α,17-dihydroxy-17α-pregnane --.

Column 4, line 23, "-lactone" should read -- γ-lactone --.

Column 4, line 28, "3,5,17-trihydroxy-17" should read -- 3β,5α,17-trihydroxy-17α --.

Column 4, line 29, "-lactone" should read -- γ-lactone --.

Column 4, line 30, "248-251." should read 248-251°. --.

Column 4, Claim 1, "3,5,17-trihydroxy-17" should read -- 3β,5α,17-trihydroxy-17α --.

Column 4, Claim 1, "acid -lactone" should read -- acid γ-lactone --.

UNITED STATES PATENT AND TRADEMARK OFFICE
CERTIFICATE OF CORRECTION

PATENT NO. : 3,919,199
DATED : Nov. 11, 1975
INVENTOR(S) : George R. Lenz

It is certified that error appears in the above—identified patent and that said Letters Patent are hereby corrected as shown below:

Column 4, Claim 2, "3-Acetyloxy" should read -- 3β-Acetyloxy --.

Column 4, Claim 2, "5,17-dihydroxy-17" should read -- 5α,17-dihydroxy-17α --.

Column 4, Claim 2, "acid -lactone" should read -- acid γ-lactone --.

Signed and Sealed this

Thirty-first Day of August 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,919,199
DATED : November 11, 1975
INVENTOR(S) : George R. Lenz

It is certified that error appears in the above-identified patent and that said Letters Patent are hereby corrected as shown below:

Front page, element [54], line 1, "5α-17" should read -- 5α,17 --.

Front page, element [54], line 3, "ACID-γ" should read -- ACID γ --.

Front page, element [54], line 4, "INTERMEDIATES" should read -- INTERMEDIATE THERETO --.

Column 1, line 1, "3,5-17-TRIHYDROXY-17-" should read -- 3β,5α,17-TRIHYDROXY-17α --.

Column 1, line 3, "INTERMEDIATES" should read -- INTERMEDIATE THERETO --.

Signed and Sealed this

First Day of February 1977

[SEAL]

Attest:

RUTH C. MASON
*Attesting Officer*

C. MARSHALL DANN
*Commissioner of Patents and Trademarks*